(12) United States Patent
Mehta et al.

(10) Patent No.: US 11,880,838 B2
(45) Date of Patent: Jan. 23, 2024

(54) SYSTEMS AND METHODS FOR USE IN PROMOTING HASH KEY ACCOUNT ACCESS

(71) Applicant: MASTERCARD INTERNATIONAL INCORPORATED, Purchase, NY (US)

(72) Inventors: Ruchik Atulkumar Mehta, Gurgaon (IN); Ishan Hussain, Gurgaon (IN); Sourabh Kumar Maheshwari, Gurgaon (IN); Jaipal Singh Kumawat, Sikar (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 237 days.

(21) Appl. No.: 17/065,477

(22) Filed: Oct. 7, 2020

(65) Prior Publication Data
US 2022/0108314 A1    Apr. 7, 2022

(51) Int. Cl.
*G06Q 20/38* (2012.01)
*G06Q 20/40* (2012.01)
*H04L 9/32* (2006.01)

(52) U.S. Cl.
CPC ....... *G06Q 20/401* (2013.01); *G06Q 20/3827* (2013.01); *G06Q 20/3829* (2013.01); *H04L 9/3228* (2013.01); *H04L 2209/56* (2013.01)

(58) Field of Classification Search
CPC .................................................. G06Q 20/401
USPC .......................................................... 705/75
See application file for complete search history.

(56) References Cited

U.S. PATENT DOCUMENTS

| | | | |
|---|---|---|---|
| 2014/0164243 A1* | 6/2014 | Aabye ................... | G06Q 20/20 705/44 |
| 2015/0032625 A1 | 1/2015 | Dill et al. | |
| 2016/0352519 A1* | 12/2016 | Brill ...................... | H04L 9/3239 |
| 2018/0323966 A1* | 11/2018 | Kanagaraj ............. | H04L 9/0643 |
| 2020/0193429 A1* | 6/2020 | Babar ................. | G06Q 20/405 |
| 2021/0049145 A1* | 2/2021 | Kohli ................... | G06F 11/0793 |

FOREIGN PATENT DOCUMENTS

WO    WO2019/192785    10/2019

* cited by examiner

*Primary Examiner* — Chinedu C Agwumezie
(74) *Attorney, Agent, or Firm* — Harness, Dickey & Pierce, P.L.C.

(57) ABSTRACT

Systems and methods are provided for identifying an account via a hash key specific to the account and presented to a third party, in connection with a network interaction. One example method includes receiving, by a computing device, from the third party, the hash key in connection with the network interaction, determining a primary account number (PAN) for the account based on the hash key, and identifying an issuer of the account based on the determined PAN. The method also includes transmitting a verification request to the issuer, to verify details of the account, and receiving a code from the issuer indicative of the verification. The method further includes intercepting an authorization request for the network interaction based on the authorization request including the hash key and, in response to the authorization request further including said code, directing the authorization request to the issuer.

20 Claims, 4 Drawing Sheets

SYSTEMS AND METHODS FOR USE IN PROMOTING HASH KEY ACCOUNT ACCESS

FIELD

The present disclosure generally relates to systems and methods for use in promoting hash key account access, and in particular, to systems and methods for use in identifying accounts to one or more parties based on hash keys for the accounts.

BACKGROUND

This section provides background information related to the present disclosure which is not necessarily prior art.

Accounts can be used for various different purposes. Payment accounts, for example, are provided to fund transactions for products (e.g., goods, services, etc.), and also, potentially, to receive funds from other parties. The payment accounts are known to be identified by primary account numbers (PANs) that include sixteen digit numbers. When users initiate transactions to such payment accounts, the users may present the PANs to merchants, or other parties, by swiping or tapping cards associated with the accounts at point-of-sale (POS) terminals (at the merchants, etc.). The POS terminals then compile authorization requests for the transactions, and transmit the authorization requests to acquirers to initiate the transactions, whereby the requests are in turn passed through payment networks to issuers of the payment accounts. More recently, it is known to present virtual wallets, for example, as included in smartphones, to pass the PANs, or tokens associated therewith, to the POS terminals (e.g., in a contactless manner, etc.). In such instances, upon receipt, the PANs or tokens are then passed to the acquirers as part of the authorization requests, and so on.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
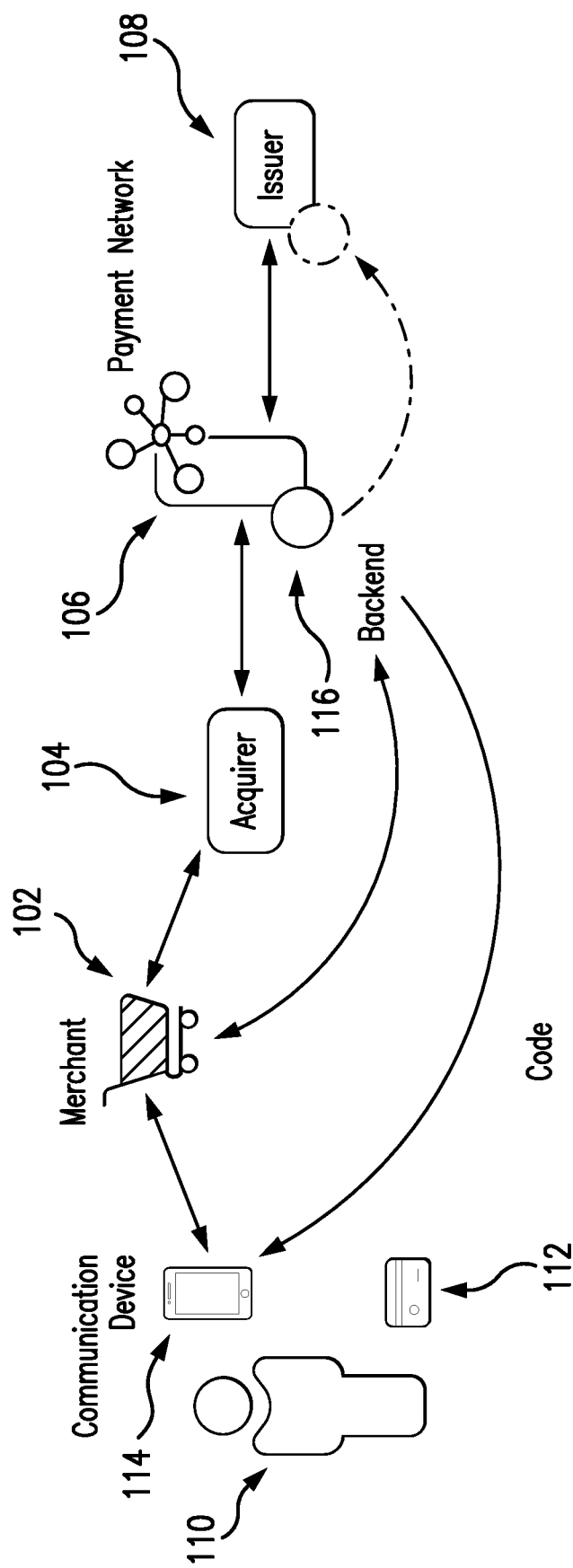
FIG. 1 is an example system of the present disclosure suitable for use in providing hash key account access to a user associated with an account, at one or more third parties, in connection with use of the account by the user at the one or more third parties.

Example embodiments will now be described more fully with reference to the accompanying drawings. The description and specific examples included herein are intended for purposes of illustration only and are not intended to limit the scope of the present disclosure.

When users interact with e-commerce merchants (broadly, third parties), each user is often required to enter credentials for an account (e.g., a primary account number (PAN), a card expiration date, a card-verification value (CVV), combinations thereof, etc.) at a checkout webpage, in order for the merchant to initiate a network interaction for the user to fund a purchase of one or more products (e.g., goods, services, etc.), via the account. The user is further required to provide and/or confirm both shipping and billing address details, to enable the merchant to complete the transaction, and to ship the product(s) to the user (or to a person designated by the user). These interactions with the merchant may be cumbersome, and insecure, to the extent that the user continually enters the credentials for the account for each transaction with the merchant thereby increasing risk that the credentials may be accessed by fraudsters (e.g., a fraudster in the presence of the user when entering the credentials, etc.). More generally, one or more of the credentials may be available on a card device for the account, and may become accessible to fraudsters when viewing or when in possession of the card device. As such, the credentials, when printed or embossed on a card device, are vulnerable to fraud.

Uniquely, the systems and methods herein provide access to accounts, by users, via hash keys associated with the accounts and provided to the users. In particular, in connection with an e-commerce or online transaction, a user provides a hash key from a card device and a name of the user (or other information for the user) at a virtual merchant location (to initiate the transaction), instead of a PAN, etc. Upon receipt, the merchant submits the hash key to a backend (via a payment network, etc.). The backend decrypts the hash key into credentials for the user's account associated with the hash key (and other data, potentially), and then communicates with an issuer of the account to verify the details of the user and/or the card device (based on the credentials). In turn, the issuer provides a code (e.g., a one-time passcode (OTP), etc.) to the user, at a communication device of the user (independent of the interaction by the user with the merchant). The user provides the code to the virtual merchant location (or to another application at the communication, for example, associated with the payment network), which then compiles and submits an authorization request for the transaction with the hash key, the user's name, and the code (when the code is received by the virtual merchant location), whereby the payment network and/or the issuer associated with the payment account may verify the code (and thus verify that the credentials for the account have been received from a valid source, etc.).

In this manner, by way of the present disclosure, the card device can be provided with the credentials (e.g., the PAN, etc. stored in a chip and/or a magstripe of the card device, etc.) for use in an electronic interaction with the card device (e.g., whereby the credentials can be accessed via the chip, the magstripe, etc.), but omits an outward presentation of the credentials (e.g., omits the PAN printed on the card device, omits the CVV printed on the card device, etc.). The user of the card device is permitted to then use the credential(s) in the electronic interactions with the card device. The user of the card device is also permitted to use the credential(s) through the hash key and authentication of the user, via the code, to provide enhanced security for online transactions, and other suitable transactions associated with direct use of the credential(s) (e.g., in transactions that rely on the user to provide the credentials to the merchant, etc.) (transactions other than electronic interactions with the card device), as desired.

FIG. 1 illustrates an example system 100, in which one or more aspects of the present disclosure may be implemented. Although the system 100 is presented in one arrangement, other embodiments may include the parts of the system 100 (or other parts) arranged otherwise depending on, for example, types of hash keys and/or accounts implemented and/or utilized, availability of e-commerce platforms, privacy rules and/or regulations, etc.

As shown, the illustrated system 100 generally includes a merchant 102, an acquirer 104 associated with the merchant 102, a payment network 106, and an issuer 108 of payment accounts, each coupled to (and each in communication with) one or more networks (as indicted by the arrowed lines). The one or more networks may each include, without limitation, a wired and/or wireless network, a local area network (LAN), a wide area network (WAN) (e.g., the Internet, etc.), a mobile network, and/or another suitable public and/or private network capable of supporting communication among two or more of the illustrated components of the system 100, or any combination thereof. One or more of the networks may further be segregated or separated, whereby, for example, the segregated or separated network(s) may include a private payment transaction network provided by the payment network 106 to the acquirer 104 and the issuer 108, and separately, a public network (e.g., the Internet, etc.) through which the merchant 102 and/or a user 110 (via a communication device 114 associated with the user 110) communicate, or through which the merchant 102 communicates with the acquirer 104, the payment network 106, and/or the issuer 108.

In this example embodiment, the merchant 102 is, at least in part, a virtual merchant, whereby the merchant 102 is accessible to the user 110 through a virtual merchant location, such as, for example, a website or network-based application. In particular in this embodiment, the user 110 interacts with the virtual merchant location via the communication device 114 or other suitable device (e.g., via a website, a network-based application installed at the communication device 114 or other device, etc.). In connection therewith, the user 110 is permitted (consistent with the description below) to initiate purchase transactions (broadly, network interactions), funded by an account (as issued to the user 110 by the issuer 108), for one or more products offered for sale by the merchant 102, via the virtual merchant location (whereby the user 110 is not present at a physical location of the merchant 102 in purchasing the products).

The acquirer 104 in the system 100 includes a banking institution or other financial institution, which has issued an account to the merchant 102. In connection therewith, funds associated with payment account transactions performed with the merchant 102 are delivered to the account (as payment for the purchased products, etc.). The payment account may include, for example, a credit account, a debit account, or a prepaid account, etc.

Similarly, the issuer 108 includes a banking institution or other financial institution, which has issued the payment account to the user 110, and through which the user 110 is permitted to fund transactions with the merchant 102 and other merchants. When the payment account is issued to the user 110, by the issuer 108, the issuer 108 also provides a card device 112 (in this example) to the user 110 whereby the user 110 can use the card device 112 to initiate transactions to the user's payment account. The card device 112 includes, in general, a card (e.g., a credit card, a debit card, a pre-paid card, or other card device, etc.), which complies with, in this embodiment, the ISO/IEC 7810 ID-1 standard (which generally indicates the particular physical dimensions and/or dimensional proportions of the card device 112 (e.g., a size of about 85.60 millimeters (about 3.38 inches) by about 53.98 millimeters (about 2.13 inches) and a shape having rounded corners each with a radius of between about 2.88 millimeters (about 0.11 inches) and 3.48 millimeter (about 0.14 inches), etc.)). Of course, however, other card devices, including cards, may be constructed according to one or more other standards (e.g., other standards such as ISO/IEC 7810 ID-2, ISO/IEC 7810 ID-3, ISO/IEC 7810 ID-000, etc.). That said, the card device 112 will be described in more detail with reference to FIG. 3 hereinafter.

The payment network 106 is disposed generally between the acquirer 104 and the issuer 108 (and other financial institutions) and is configured to facilitate communication between the acquirer 104 and the issuer 108 to permit the above network interaction(s) between the user 110 (and others) and the merchant 102 (and others) to be authorized. The interactions are facilitated through an authorization request, generated by the merchant 102 and communicated through the acquirer 104 and the payment network 106 to the issuer 108, as described below, where the authorization request generally abides by the ISO 8583 standard. The issuer 108 is configured to then determine whether to authorize or decline the transaction, and to provide an authorization reply back to the merchant 102 indicating the same. Once the transaction is authorized, the payment network 106 is further configured to clear and settle the transaction, if authorized, whereby funds are transferred to and from the acquirer 104 (on behalf of the merchant 102, for example) and the issuer 108 (on behalf of the user 110, for example) (along with other approved transactions in general facilitated through the payment network 106).

With continued reference to FIG. 1, the user 110 is associated with the communication device 114. The communication device 114 is configured to permit the user 110 to send and/or receive messaging (via one or more networks, etc.), and to also interact with a virtual merchant location of the merchant 102 (again via one or more networks, etc.). In connection therewith, the communication device 114 may include, for example, a web browser and/or network-based application (not shown) associated with and/or provided by the merchant 102, and may further include a separate network-based application associated with the payment network 106 and/or the issuer 108, either (or all) of which configures the communication device 114 to operate as described herein (and which allows such interactions with the merchant 102, the backend 116, and/or the issuer 108). It should further be appreciated that the communication device 114 may communicate through one or more networks, including, for example, cellular or mobile networks, private wireless networks, etc. That said, the communication device 114 may include, for example, a smartphone, a tablet, a laptop, or another portable computing device (or other computing device in general), etc.

It should be appreciated, as indicated above, that the user 110 may interact with another computing device, not shown in FIG. 1, to access the virtual merchant location (e.g., interfaces associated therewith), whereby interaction(s) with the merchant 102 may be through the other computing device (and not through the communication device 114), while interaction(s) with the payment network 106 and/or the issuer 108 (or a backend 116 associated therewith), for example, as described more hereinafter, are then through the communication device 114.

While only one merchant 102 and one user 110 (and one card device 112 and one communication device 114) are illustrated in FIG. 1, it should be appreciated that any number of merchants and/or users, as described herein, may be included in other embodiments. Likewise, a different number of acquirers, payment networks, and issuers may be included in other system embodiments. In still other embodiments, different merchants may have different acquirers, and different users may employ payment accounts issued by multiple different issuers.

Figure 2:
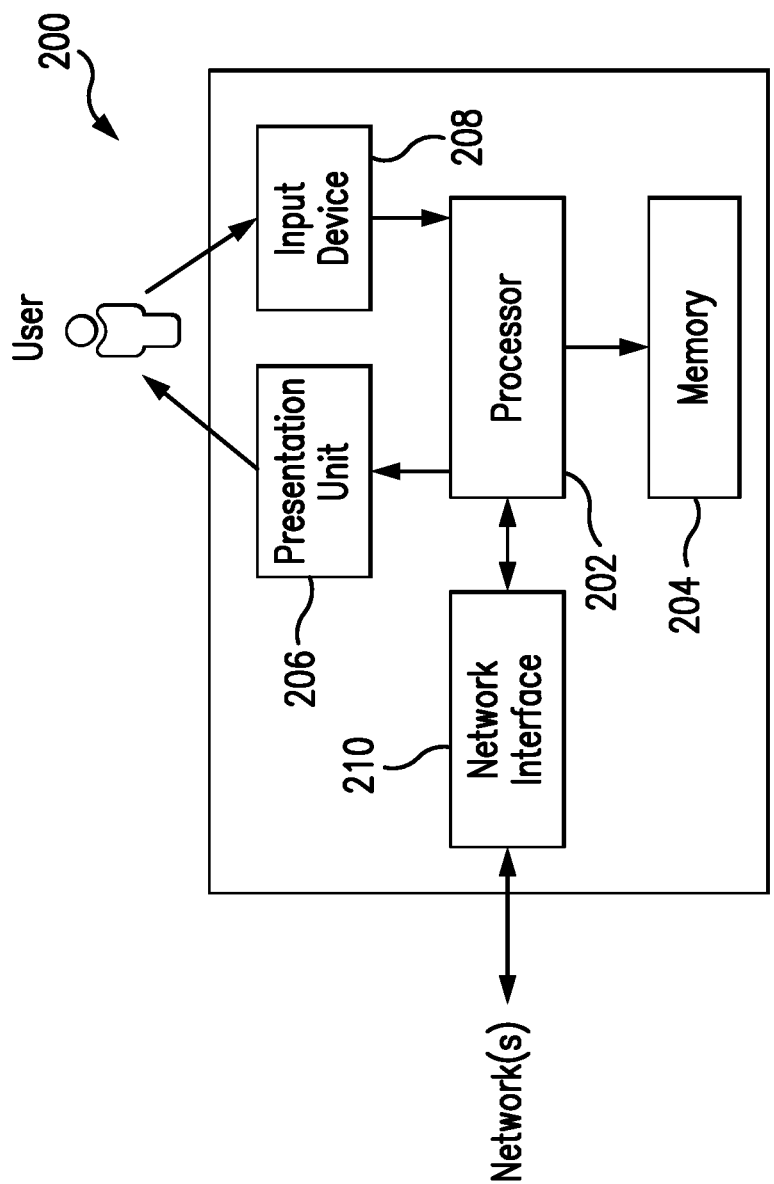
FIG. 2 is a block diagram of a computing device that may be used in the example system of FIG. 1.

FIG. 2 illustrates an example computing device 200 that can be used in the system 100. The computing device 200 may include, for example, one or more servers, workstations, personal computers, laptops, tablets, smartphones, point-of-sale (POS) terminals, card devices, etc. In addition, the computing device 200 may include a single computing device, or it may include multiple computing devices located in proximity or distributed over a geographic region, so long as the computing devices are specifically configured to function as described herein. In particular, in the example system 100 of FIG. 1, each of the merchant 102, the acquirer 104, the payment network 106, and/or the issuer 108 may include, or may be implemented in, a computing device, such as the computing device 200. In addition, the card device 112 and the communication device 114 associated with the user 110 may each be considered a computing device consistent with the computing device 200. That said, the system 100 should not be considered to be limited to the computing device 200, as described below, as different computing devices and/or arrangements of computing devices may be used. In addition, different components and/or arrangements of components may be used in other computing devices.

With reference now to FIG. 2, the computing device 200 generally includes a processor 202, and a memory 204 that is coupled to (and in communication with) the processor 202. The processor 202 may include, without limitation, one or more processing units (e.g., in a multi-core configuration, etc.), including a general purpose central processing unit (CPU), a microcontroller, a reduced instruction set computer (RISC) processor, an application specific integrated circuit (ASIC), a programmable logic device (PLD), a gate array, and/or any other circuit or processor capable of the functions described herein. The above examples are example only, and are not intended to limit in any way the definition and/or meaning of processor.

The memory 204, as described herein, is one or more devices that enable information, such as executable instructions and/or other data, to be stored and retrieved. The memory 204 may be configured to store, without limitation, transaction data, credentials (e.g., PANs, expiration dates, CVVs, etc.) for accounts, codes (e.g., OTPs, etc.), authorization messages, relationships between hash keys and accounts, and/or other types of data suitable for use as described herein, etc. In addition, the memory 204 may include one or more computer-readable storage media, such as, without limitation, dynamic random access memory (DRAM), static random access memory (SRAM), read only memory (ROM), erasable programmable read only memory (EPROM), solid state devices (e.g., EMV chips, etc.), CD-ROMs, thumb drives, tapes, flash drives, hard disks, and/or any other type of volatile or nonvolatile physical or tangible computer-readable media. It should be appreciated that the memory 204 may include a variety of different memories. In various embodiments, computer-executable instructions may be stored in the memory 204 for execution by the processor 202 to cause the processor 202 to perform one or more of the operations described herein (e.g., one or more of the operations recited in method 400, etc.), such that the memory 204 is a physical, tangible, and non-transitory computer-readable media and such that the instructions stored in the memory 204 enable the computing device to operate as (or transform the computing device into) a specific-purpose device configured to then effect the features described herein.

The computing device 200 also includes a presentation unit 206 and an input device 208 coupled to (and in communication with) the processor 202.

The presentation unit 206 outputs information and/or data to a user (e.g., the user 110, other users, etc.) by, for example, displaying, audibilizing, and/or otherwise outputting the information and/or data. In some embodiments, the presentation unit 206 may comprise a display device such that various interfaces (e.g., application screens or notification banners, webpages, text messages, etc.) may be displayed at computing device 200, at the display device, to display such information and/or data, etc. With that said, the presentation unit 206 may include, without limitation, a cathode ray tube (CRT), a liquid crystal display (LCD), a light-emitting diode (LED) display, an organic LED (OLED) display, an "electronic ink" display, speakers, combinations thereof, etc. In addition, the presentation unit 206 may include multiple devices in some embodiments.

The input device 208, when present in the computing device 200, is configured to receive input from the user 110, for example. The input device may include, without limitation, a keyboard, a mouse, a touch sensitive panel (e.g., a touch pad or a touch screen, etc.), another computing device, and/or an audio input device. Further, in some example embodiments, a touch screen, such as that included in a tablet, a smartphone, or similar device, may function as both the presentation unit 206 and the input device 208.

The illustrated computing device 200 further includes a network interface 210 coupled to (and in communication with) the processor 202 and the memory 204. The network interface 210 may include, without limitation, a wired network adapter, a wireless network adapter, a mobile adapter, or other device capable of communicating to one or more different networks (e.g., the Internet, a private or public LAN, WAN, mobile network, combinations thereof, or other suitable networks, etc.). In some example embodiments, the processor 202 and one or more network interfaces may be incorporated together.

Figure 3:
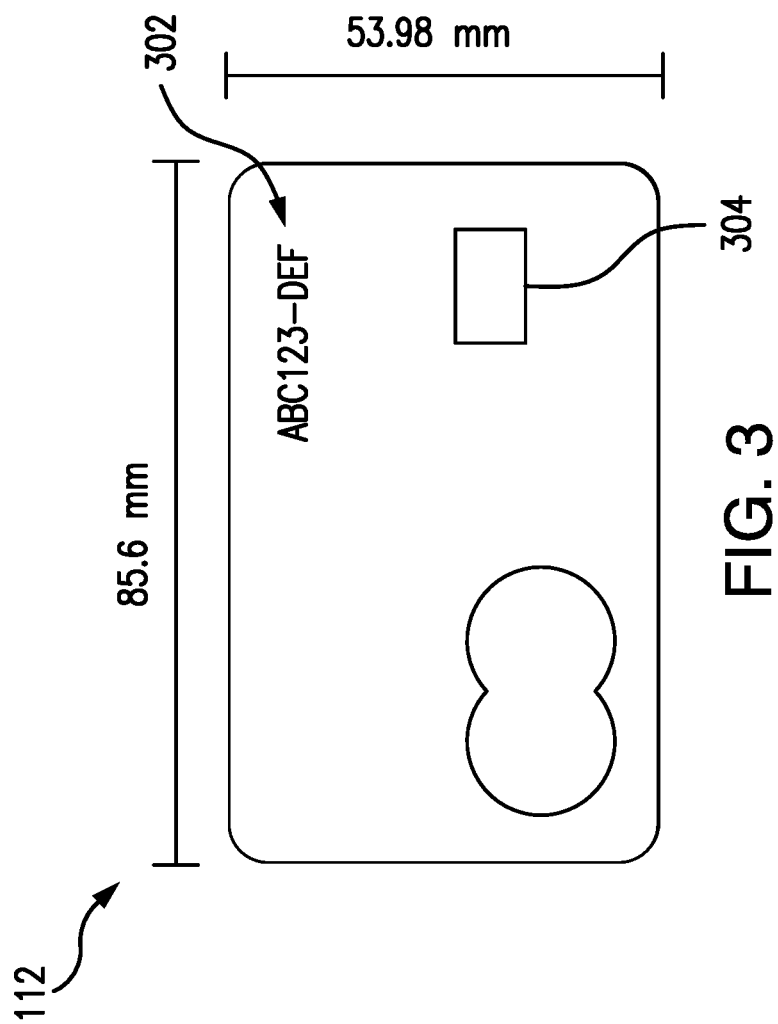
FIG. 3 illustrates an example card device suitable for use in the system of FIG. 1, where the card device may be associated with the account of the user.

Referring now to FIG. 3, the card device 112 of the system includes a processor 304 (e.g., consistent with processor 202, etc.), which may include a contact and/or contactless chip (e.g., a security chip such as an EMV chip, etc.). While the processor 304 is included in the card device 112, it should be appreciated that multiple such processors or devices (or other chips) (e.g., biometric sensors, etc.) may be included in other card device embodiments.

The card device 112 also includes, in this embodiment, a hash key 302 (e.g., ABC123-DEF, 257181ce026cf8b3ed4900d3c1940a13, etc.), which includes an alpha-numeric (or numeric) code associated with the payment account credentials of the payment account issued to the user 110 by the issuer 108. The hash key is printed, etched, embossed, etc., into (or onto) the card device 112 (e.g., a body of the card device 112, etc.), and may be positioned on a front side of the body of the card device 112 (as shown in FIG. 3) and/or a back side of the card body (e.g., as elected by the user 110 to have the hash key 302 provided on the card body, etc.). The hash key 302 on the card device 112 generally includes an encrypted alpha numeric value that can be decrypted via a desired decryption method to provide a decrypted key. The decrypted key, then, may be looked up in a data structure for validation (e.g., at a backend 116 described more below, etc.) and, in turn, may be used to identify (or locate) and return details for the card device 112 and corresponding account (e.g., account credentials, user data, etc.). Alternatively, instead of using a decryption key, the hash key may be stored in a data structure in association with the user's account. Here, decryption may include looking up the hash key in the data structure, together with the user's name, to then identify details for the user's account (when both the hash key and the user's name are found together in combination for a given account).

In connection therewith, the hash key 302 may be generated (e.g., by the issuer 108, by the backend 116, by the payment network 106, by another party, etc.) using a suitable hashing algorithm, based on (as input) one or more of (without limitation) the PAN for the user's account, the user's name, the expiration date for the card device 112, the CVV, the user's address, and/or location data for the user 110. For instance, salting may be performed using one or more random alphanumeric values or one or more images to generate a salting string (or salt). And then, hashing may be performed, to generate the hash key 302, on the PAN for the user's account, for example, and the salting string using a secure hash algorithm (e.g., SHA 256, etc.). In connection therewith, the salting may provide additional security, as the PAN may be known, but the salting string would never be known. The hash key 302, then, may be recorded in a data structure (e.g., in memory 204, etc.) associated with the payment network 106 and/or backend 116, with a one-to-one mapping to the PAN (or other data associated with the user 110 and/or the user's account (e.g., the user's name, the expiration date for the card device 112, and/or another credential(s) for the user's account, etc.) and in association with one or more details of the user's account.

Table 1 illustrates an example segment of a data structure including mappings of multiple PANs to corresponding hash keys (and associated card details, etc.). In connection therewith, John Smith is associated with an account having a PAN of 1111-1111-1111-1111, and a card device having a CVV of 123 and an expiration date of January YYYY (i.e., 01 YYYY). In generating the hash key for John Smith, then, the salting string is generated, using random alphanumeric variables (for John Smith), and combined with the PAN for John Smith's account (i.e., 11111111111111111ACEUD2363DFT). A SHA 256 hash is then performed thereon to generate the hash key for John Smith's account.

search in the data structure for the hash key and, when found, compare the user's name received with the hash key to the user's name included in the identified entry to verify accuracy. If both the hash key and the user's name are found in a single entry in the data structure, the corresponding data associated with the entry (broadly, the decrypted values or the user's account) will be retrieved.

In this example embodiment, the PAN for the payment account (as well as other credentials for the account) is also included on the processor 304 (e.g., an EMV chip, etc.) and/or on a magstripe (not shown) on a back side of the card device 112, or on other computer-readable medium/mechanism associated with the card device 112. As such, the card device 112 may still be used to inform a POS terminal of the PAN (and other credentials) of the payment account associated with the card device 112. However, in this example embodiment, the PAN (and other credentials (e.g., the user's name, the expiration date, the CVV, etc.)) for the account are omitted from the front side and/or back side of the card device 112, whereby the PAN is not printed and/or embossed (or otherwise present, viewable, etc.) on the first side and/or back side of the card device 112. As such, the user 110 relies on the hash key 302 for transactions when the user 110 is apart from the POS terminal (e.g., in transactions initiated remotely from the merchant 102 (via a web browser, over the phone, etc.), etc.), and the user 110 relies on the processor 304 or magstripe of the card device 112 when the user 110 is present at the POS terminal to inform the POS terminal of the credentials of the payment account associated with the card device 112 (e.g., in transactions initiated at the merchant 102, etc.).

The card device 112 includes the card body (whereby the illustrated card device 112 may be considered a card), which is comprised of plastic (or other suitable material) of sufficient character to carry the processor 304, a memory, and a power source on the card body, and whereby an internal electronic layer associated with such components may be generally flexible in nature to accommodate the plastic construction of the card body, etc. As indicated above, the card device 112 is provided consistent with the ISO/IEC 7810 ID-1 standard. As such, as shown in FIG. 3, the card body, in this example, defines a generally rectangular shape that measures about 85.60 millimeters (about 3.38 inches) long and about 53.98 millimeters (about 2.13 inches) wide (e.g., whereby the card device 112 is generally consistent in appearance with other cards that satisfy the ISO/IEC 7810 ID-1 standard, etc.). The card body also has a thickness of about 0.76 mm (about 0.03 inches). It should be appreciated, though, that the size of the card body may vary as permitted by one or more standards in various embodiments (e.g., plus

TABLE 1

| PAN | User Name | Card Details | Salting String | Hash Key |
| --- | --- | --- | --- | --- |
| 1111-1111-1111-1111 | John Smith | 123, 01YYYY | 1ACEUD2363DFT | 257181ce026cf8b3ed4900d3c1940a13 |
| 2222-2222-2222-2222 | Jane Jones | 456, 05YYYY | <Image A> | odoje29236eokejoe3290fd4fiehe93j83 |
| 3333-3333-3333-3333 | Bill Smith | 789, 03YYYY | DUEY32HYEID76 | 5eihe37312nw82b8dbdd9dnd02823e3t |
| 4444-4444-4444-4444 | John Doe | 543, 10YYYY | <Image B> | 83ydih8e3d9e9w3n39yr3bei8y33o833i |

In the example of Table 1, to decrypt the hash key, then, the backend 116 may receive (or require) both the hash key and the user's name. In particular, the backend 116 may or minus about 0.10 millimeters (about 0.004 inches), about 0.25 millimeters (about 0.01 inches), about 0.5 millimeters (about 0.02 inches), about 1 millimeters (0.04 inches), about 2 millimeters (about 0.08 inches), about 5 millimeters (about 0.20 inches), about 10 millimeters (about 0.39 inches), etc.).

As discussed above, other card device embodiments may be consistent with one or more other applicable standards related to card devices, whereby the card device 112 may be sized and/or shaped differently. For example, in other embodiments, card devices may have horizontal or vertical card designs, or differently shaped edges, etc. In addition, in one or more embodiments, card devices herein may have (without limitation) dimensions (lengths and/or widths) ranging between about 15 millimeters (about 0.59 inches) and about 150 millimeters (about 5.91 inches), and thickness dimensions ranging from about 0.1 millimeters (about 0.004 inches) to about 1 millimeters (about 0.04 inches).

With that said, it should be appreciated that the systems described herein are not limited to the card device 112 (as depicted in FIGS. 1 and 3), as different card devices may be used, and conversely, the card devices described herein are not limited to the system 100. In connection therewith, it should be appreciated that the user 110 may have an option to have the hash key provided on the body of the card device, or to have the has key provided to the user 110 apart from the card device (e.g., like a conventional PIN, etc.), or to have the hash key provided in both manners. Further, the user 110 may have an option to have the hash key provided in a digital manner (e.g., for use via a virtual wallet at the communication device 114, via an online banking portal, via an application associated with the merchant 102 and installed at the communication device 114, etc.).

Referring again to FIG. 1, the system 100 includes the hash backend 116. The hash backend 116 includes one or more computing devices, which may be integrated, in whole or in part, with the payment network 106, as shown, for example, or with the issuer 108 (as indicated by the dotted line in FIG. 1) in some embodiments, or with both. In at least one embodiment, the hash backend 116 is a standalone device separate from the payment network 106 and the issuer 108. The hash backend 114 is configured, by executable instructions, to operate as described herein.

When the card device 112 is issued to the user 110, the hash backend 116 is configured to store the hash key 302 included on the card device 112 (or otherwise provided to the user 110) in a data structure and to associate the hash key with the PAN, expiration date, CVV, and, potentially, other suitable data, associated with the payment account issued by the issuer 108 to the user 110 and/or with data associated with the user 110 in general (e.g., shipping address, billing address, communication device identifiers (e.g., phone number, application ID, etc.), contact information, etc.). The data structure is generally included in the hash backend 116, but may be separate in various embodiments, whereby the hash backend 116 is configured to access the data structure. That said, it should be appreciated that where the credentials for the payment account are encrypted and/or encoded into the hash key 302, that a data structure may be omitted from the system 100, and the hash key 302 may not be stored by the hash backend 116 (as the intermediate link may then not be required or necessary).

After the card device 112 is issued to the user 110, the user 110 may seek to initiate an online transaction, via the virtual merchant location of the merchant 102, at the communication device 114 (or other computing device capable of accessing the merchant's virtual location). In doing so, the user 110 may select one or more products (e.g., goods, services, etc.) to purchase and add the product(s) to a virtual shopping cart and/or proceed to checkout. Thereafter, the communication device 114, as configured by the virtual merchant location, solicits a payment from the user 110 for the product(s). In turn, the user 110 access the card device 112 and enters the hash key 302 from the card device 112 at the communication device 116, in lieu of the PAN for the payment account (which may or may not be included on the card device 112). Alternatively, the user 110 may enter the hash key 302 to the communication device 116 from memory (e.g., where the hash key 302 is provided to the user 110 in a manner similar to a conventional PIN, etc.). Or, the hash key 302 may be stored in a digital format at the communication device 116 whereby the user 110 may instruct the communication device 116 to retrieve the digital hash key.

In addition, the communication device 114, as configured by the virtual merchant location, may further solicit a name or other detail associated with the user 110 and/or the card device 112 (in connection with receiving the hash key, or potentially, later (or earlier) depending on the embodiment), for use in authenticating the user 114. For example, the communication device 114 may solicit the name of the user 110 (e.g., as it appears on the card device 114, etc.) (e.g., John S. Smith or Jonathan Smith, etc.). In another example, the communication device 114 may solicit a street address or other information known to the user 110. Upon receipt of the information, if solicited or provided, the communication device 114, as configured by the virtual merchant location, submits the hash key 302 (and potentially, the other solicited information such as the name of the user 110) to the merchant 102.

The merchant 102, in turn, is configured to transmit the hash key (and potentially the other received information such as the name of the user 110) to the payment network 106 and/or the hash backend 116 (e.g., via conventional payment rails associated with the payment network 106, via an application programming interface (API) call to the payment network 106 and/or the hash backend 116, etc.). The hash backend 116 is configured to then decrypt the hash key into one or more credentials for the user's payment account, including, for example, the PAN, expiration date, CVV, etc. The decryption may include a mathematical operation on the hash key, or it may include a look-up in the data structure.

After decrypting the credential(s), the hash backend 116 is configured to verify the user 110 and/or the details associated with the corresponding card device 112 (e.g., based on the other information provided by the user 110 such as the user's name, etc.). In addition, the hash backend 116 is configured to identify the issuer 108 based on the credential(s) for the user's payment account. The hash backend 116 is configured to then transmit a request to the issuer 108 to verify the card details for the user's card device 112 and evaluate one or more risk factors for the underlying transaction. In response, the issuer 108 is configured to generate a one-time-passcode (OTP) and to transmit the OTP to the communication device 114 (e.g., as a SMS message, email, application notification, etc.) and to further transmit the OTP to the hash backend 116 (where the hash backend 116 is configured to store the OTP in the data structure in association with the credential(s) and/or the hash key 302).

Next, in one example implementation, the merchant 102 is configured to solicit the OTP from the user 110, via the virtual merchant location (and, potentially, additional information about the user 110 such as a name, birth year, etc. for purpose of further authentication, for example, if not done when soliciting the hash key 302). As such, the communication device 114, as configured by the virtual merchant location, solicits the OTP (and additional information) from the user 110. In the meantime, the communication device 114 is configured to receive the OTP from the issuer 108 and to display the OTP to the user 110. Consequently, the user 110 is able to provide the OTP at the virtual merchant location, via the communication device 114. The user 110 may further be permitted to provide the additional information at the virtual merchant location, via the communication device 114. The communication device 114, as configured by the virtual merchant location, then submits the OTP (and additional information) to the merchant 102. The merchant 102 is then configured, in this implementation, to generate and transmit an authorization request for the transaction, which includes the hash key 302, the additional information for the user 110 (e.g., the user's name, etc.), and the OTP as provided by the user 110 (e.g., included in a defined or unused data element (DE), etc.). The authorization request (e.g., an ISO 8583 message, etc.) is transmitted to the payment network 106, via the acquirer 104 (along the payment rails associated with the payment network 106).

In another example implementation, the payment network 106 is configured to solicit the OTP from the user 110, via a payment network application installed at the communication device 114. As such, the communication device 114, as configured by the payment network application, solicits the OTP from the user 110. In the meantime, again, the communication device 114 is configured to receive the OTP from the issuer 108 and to display the OTP to the user 110. Consequently, the user 110 is able to provide the OTP to the payment network application, via the communication device 114. The user 110 may further be permitted to provide the additional information at the payment network application, via the communication device 114. The communication device 114, as configured by the payment network application, then submits the OTP (and additional information) to the payment network 106.

In this implementation, the merchant 102 is configured to generate and transmit an authorization request for the transaction in connection with transmitting the hash key 302 to the hash backend 116, or at some time thereafter. The authorization request includes the hash key 302 and the additional information for the user 110 (e.g., the user's name, etc.) (e.g., included in a defined or unused data element (DE), etc.). The authorization request (e.g., an ISO 8583 message, etc.) is transmitted to the payment network 106, via the acquirer 104 (along the payment rails associated with the payment network 106).

That said, in both of the above implementations, upon receipt of the authorization request at the payment network 106, the payment network 106 (or the hash backend 116, in communication with the payment network 106) is configured to access the authorization request and to compare the OTP (either included in the authorization request or received directly from the user 110 via the payment network application) to the OTP generated by the issuer 108 (as stored in the data structure), as well as, potentially, the additional information, to reference information for the user 110 (e.g., in connection with authenticating the user 110, etc.). When the OTPs (and additional information) match/matches, the payment network 106 (and/or hash backend 116) is configured to update the authorization request, or not, to indicate the match (or user authentication), or conversely, the lack of match (or lack of user authentication). Additionally, the payment network 106 (and/or hash backend 116) is configured to modify the authorization request to include the OTP (for the implementation where the OTP is received directly from the user 110 via the payment network application).

The payment network 106 is configured to then pass the authorization request on to the issuer 108, whereupon the issuer 108 is configured to decide to authorize or decline the transaction. In either instance, the issuer 108 is configured to transmit an authorization reply, indicating the result, to the merchant 102, via the payment network 106 and the acquirer 104. Then, the merchant 102 is permitted to complete the transaction and arrange for delivery of the product(s) to the user 110.

Figure 4:
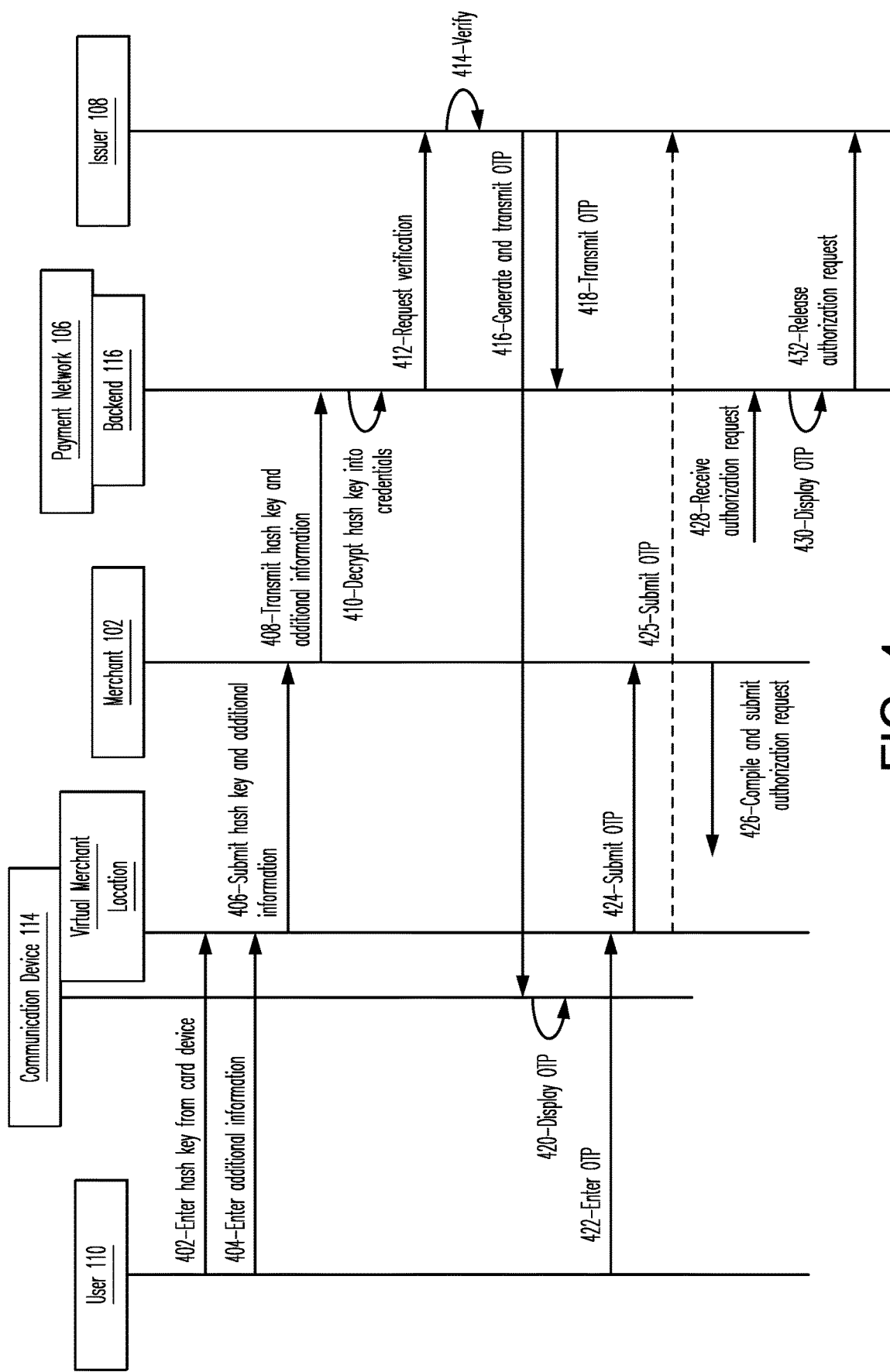
FIG. 4 is an example method, which may be implemented in connection with the system of FIG. 1, for identifying an account, via a hash key presented to a third party, in connection with a network interaction directed to the account.

FIG. 4 illustrates an example method 400 for use in identifying an account, via a hash key presented to a third party (specifically, the merchant 102), in connection with a network interaction by a user (user 110) with the third part, in accordance with the description herein. In particular, the method 400 is described with reference to the hash backend 116 in the system 100, and with additional reference to other aspects of system 100. The method 400 is also described with reference to computing device 200. It should be appreciated, however, that the methods herein are not limited to the system 100 and the computing device 200, and that the systems and computing devices herein are not limited to method 400.

In the method 400, as explained above, the user 110 is in possession of the card device 112, which includes, thereon (in this example), hash key 302 associated with the payment account issued by the issuer 108, to the user 110, and associated with one or more credentials for the payment account (e.g., the PAN, the expiration date for the card device 112, the CVV, etc.).

When the user 110 purchases a product from the merchant 102, and is checking out at the virtual merchant location, associated with the merchant 102, the user 110 enters the hash key 302, at 402, from the card device 112. In particular, the virtual merchant location includes an interface, which, in turn, includes a field into which the hash key 302 may be entered. The field may be associated with an instruction to solicit the hash key 302 or an identification of the hash service and/or capability of the merchant 102 (e.g., "Mastercard Hash Key Purchase Enabled," etc.).

In the same interface or a different interface, the virtual merchant location further solicits information in connection with the hash key 302. For example, the interface may solicit the user 110 to enter his/her name as it appears on the card device 112 (or other information included on the card device 112), for use in authenticating the user 110, etc. Additionally, or alternatively, the virtual merchant location may solicit information known to the user 110, but not included on the card device 112 (e.g., mother's maiden name, birth month, etc.), for use in such authentication. Regardless, the virtual merchant location includes an interface, which includes a field for the user 110 to enter the additional information. At 404, the user 110 enters the additional information (as solicited by the virtual merchant location).

In response to the hash key 302 being entered by the user 110, at the virtual merchant location, the virtual merchant location (via the communication device 114 in this example, or other computing device through which the user 110 performs the purchase at the virtual merchant location) submits, at 406, the hash key 302 and the additional information to the merchant 102. It should be appreciated that the hash key 302 and the additional information may be submitted together, or separately, depending on, for example, the interface(s) soliciting the hash key 302 and the additional information. In any case, upon receipt, the merchant 102 transmits, at 408, the hash key 302 and the additional information to the hash backend 116 (e.g., via conventional payment rails associated with the payment network 106, via an API call with the payment network 106 and/or the hash backend 116, etc.).

The hash backend 116 then decrypts the hash key 302 received from the merchant 102, at 410, into credential(s) associated with the payment account. The decryption may include decrypting the hash key 302 alone, or a concatenation (or other combination) of the hash key 302 and the name of the user 110 (broadly, the additional information), by one or more mathematical operators and/or functions. In this example, the decryption supposes that the credential(s) of the payment account are encrypted into the hash key 302. That said, in other examples, the hash key and the additional information may be employed to look-up the account credential(s) in one or more data structures, i.e., where the hash key is associated with the credential(s) (e.g., as in Table 1, etc.). It should be appreciated that the additional information may be employed as part of the decryption, or may be separate whereby the additional information is employed as further authentication of the user 110 (e.g., evidence of possession of the card device 112, etc.).

Once decrypted, the hash backend 116 identifies the issuer 108, associated with the user's payment account, based on the credential(s). The hash backend 116 then transmits a request to the issuer 108, at 412, for verification of the user's account. And, the issuer 108 verifies, at 414, the card details for the user's card device 112 and/or payment account (e.g., verifies that the name provided by the user 110 matches the name associated with the user's account, etc.) and evaluates one or more risk factors for the underlying transaction (e.g., based on an account balance of the user's account, prior transactions by the user, etc.). In connection therewith, the issuer 108 identifies the user's communication device 114 based on the hash key, the credential(s), the additional information, etc. In response, at 416, the issuer 108 generates an OTP for the transaction (or more generally for the user 110 and/or the user's payment account) and transmits the OTP to the identified communication device 114. The OTP is randomly generated, in this example embodiment, but may be generated otherwise in other embodiments. And, the OTP may be transmitted, via SMS message, email, application notification, or otherwise to the communication device 114. Additionally, in this example, the issuer 108 transmits, at 418, the OTP to the payment network 106 (and/or the hash backend 116). The payment network 106 and/or the hash backed is(are) configured to store the OTP in the data structure in association with the credential(s) and/or the hash key 302.

Then, upon receiving the OTP, the communication device 114 displays, at 420, the OTP to the user 110. The communication device 114 may display the OTP as part of a SMS message, or an email or an application notification banner, etc. Consequently, the user 110 is then able to enter the OTP to the virtual merchant location, at 422, in response to the solicitation for the code. Like above, the virtual merchant location (via communication device 114 in this example) submits, at 424, the OTP to the merchant 102. Optionally, as indicated by the broken lines in FIG. 4, the user 110 may instead enter/submit, at 425, the OTP to an application, associated with the payment network 106 and/or the hash backend 116, whereby the OTP is instead provided directly to the payment network 106 and/or the hash backend 116 (independent of the merchant 102).

Further in the method 400, the merchant 102 compiles an authorization request for the purchase of the product(s) selected by the user 110 and transmits the authorization request, at 426, to the payment network 106 (along the payment rails provided by the payment network 106, via the acquirer 104). This may be done in response to the user 110 providing the OTP to the virtual merchant location, whereby the authorization request generally includes the hash key 302, the user's name, and the OTP. Alternatively, when the user 110 provides the OTP directly to the payment network 106 and/or hash backend 116, the merchant 102 may compile and transmit the authorization request at any time after receiving the hash key 302 from the user 110. Here, the authorization request generally includes the hash key 302 and the user's name (but not the OTP). Regardless, it should be appreciated that the authorization request does not include credentials for the user's payment account.

Upon receipt of the authorization request at the payment network 106, the hash backend 116 receives, at 428, the authorization request. More specifically, the payment network 106 (and/or the backend 116) may identify the authorization request based on the hash key 302 included therein, based on the recent communication from the merchant 102 regarding the hash key 302, etc. In turn, when the hash key 302 is present, the hash backend 116 confirms, at 430, the OTP as either included in the authorization request or received directly from the user 110 matches the OTP generated by the issuer 108 (as stored in the data structure). Additionally, the payment network 106 (and/or hash backend 116) may modify the authorization request to include the OTP (when the OTP is not yet included in the authorization request and is instead received directly from the user 110 at the payment network and/or hash backend 116).

When the OTP is confirmed, the hash backend 116 releases, at 432, the authorization request (e.g., in some implementations, the hash backed 116 may release the authorization request only when the OTP is confirmed; etc.). In doing so, the authorization request generally includes the hash key, the user's name, and the OTP. And, the transaction proceeds to the issuer 108 in a conventional manner. The issuer 108 may identify the user's payment account based on the hash key 302 and the prior interaction with the hash backend 116 (at 412), or it may identify the user's payment account based on the OTP included in the authorization request. In either case, the issuer 108 proceeds to either approve or decline the transaction (potentially, based at least in part on the verification performed at 414) and transmits an authorization reply indicating the same back to the merchant 102. In connection therewith, when the OTP is not confirmed by the hash backend 116 (e.g., when the OTP received by the hash backend 116 does not match the OTP included in the authorization request, or when the authorization request includes the hash key 302 but does not include an OTP, etc.), the hash backend 116 and/or the payment network 106 may decline the transaction and/or may not transmit the transaction (and/or the authorization request) on to the issuer 108 and/or may return the transaction (and/or the authorization request associated therewith) to the merchant 102.

In view of the above, the systems and methods herein permit a card device to be reformatted to include a hash key printed or otherwise visible thereon, in lieu of a PAN, whereby payment details for the account are not visible on the card device (or, potentially, in addition to the PAN) to provide enhanced security for e-commerce transactions and to promote efficiencies in e-commerce transactions. For example, a user may enter the hash key when initiating a transaction, instead of various payment details, such as, for example, the PAN, expiration date, CVV, billing address, etc. What's more, fraudulent transactions may be reduced over conventional prevention strategies, as the user will be further authenticated by entry of additional information, such as, a name as it appears on the card device, and a code (e.g., a OTP, etc.).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by one or more of the steps, features, operations or configurations recited in the following claims, including, for example: (a) receiving, by a computing device, from a third party, a hash key specific to an account associated with a user in connection with an interaction by the user with the third party, the hash key including alpha-numeric characters and being distinct from a primary account number (PAN) for the account; (b) determining, by the computing device, the PAN for the account based on the hash key; (c) identifying, by the computing device, an issuer of the account based at least in part on the determined PAN; (d) transmitting, by the computing device, a verification request to the issuer of the account, whereby the issuer verifies one or more details associated with the account; (e) receiving, by the computing device, a code from the issuer indicative of the verification of the one or more details associated with the account; (f) identifying, by the computing device, an authorization request for the interaction between the user and the third party, the authorization request including at least the hash key; (g) intercepting the authorization request, based on the authorization request including the hash key; (h) in response to the authorization request further including said code, directing the authorization request to the issuer; (i) receiving, by the computing device, from the third party, a name of the user as the name appears on a card device specific to the account; and (j) storing, by the computing device, the code received from the issuer in a data structure, in association with the PAN for the account.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for identifying an account, via a hash key presented to a third party, in connection with a network interaction involving the third party, the method comprising:

receiving, by a backend computing device, from a third party, a hash key specific to an account associated with a user in connection with an interaction by the user with the third party, the hash key including alpha-numeric characters, the hash key issued by an issuer of the account, and the hash key being distinct from a primary account number (PAN) for the account, the backend computing device separate from the issuer of the account;

determining, by the backend computing device, the PAN for the account based on the hash key;
identifying, by the backend computing device, an issuer of the account based at least in part on the determined PAN;
transmitting, by the backend computing device, to the issuer of the account, a verification request including one or more details associated with the account, whereby the issuer verifies the one or more details associated with the account;
receiving, by the backend computing device, a code from the issuer, the code indicative of verification of the one or more details associated with the account by the issuer;
identifying, by the backend computing device, an authorization request for the interaction between the user and the third party, the authorization request including at least the hash key and a user-entered code;
intercepting the authorization request, based on the authorization request including the hash key while confirming, by the backend computing device, the code from the issuer matches the user-entered code in the authorization request; and then
based on the code from the issuer matching the user-entered code, directing the authorization request to the issuer.

2. The computer-implemented method of claim 1, wherein the hash key includes an encrypted version of the PAN; and
wherein a number of the alpha-numeric characters of the hash key is different than a number of characters of the PAN.

3. The computer-implemented method of claim 2, further comprising receiving, by the backend computing device, from the third party, a name of the user as the name appears on a card device specific to the account; and
wherein determining the PAN for the account further includes determining, by the backend computing device, the PAN for the account based on the hash key and the name of the user.

4. The computer-implemented method of claim 1, wherein the hash key includes an encrypted version of the PAN and a salt.

5. The computer-implemented method of claim 4, wherein the salt includes an image.

6. The computer-implemented method of claim 1, wherein the code includes a random code.

7. The computer-implemented method of claim 6, wherein the random code includes a one-time passcode, randomly generated by the issuer.

8. The computer-implemented method of claim 1, further comprising storing, by the backend computing device, the code received from the issuer in a data structure, in association with the PAN for the account.

9. The computer-implemented method of claim 8, wherein determining the PAN for the account based on the hash key includes searching for the PAN in the data structure, based on the hash key.

10. A non-transitory computer-readable storage medium including computer-executable instructions for identifying an account via a hash key, which, when executed by a processor of a backend computing device, cause the processor to:
receive, from a third party, a hash key specific to an account associated with a user in connection with an interaction by the user with the third party, the hash key including alpha-numeric characters, the hash key issued by an issuer of the account, and the hash key being distinct from a primary account number (PAN) for the account;
determine the PAN for the account based on the hash key;
identify the issuer of the account based at least in part on the determined PAN;
transmit a verification request including one or more details associated with the account to the issuer of the account, whereby the issuer verifies the one or more details associated with the account;
receive a code from the issuer, the code indicative of verification of the one or more details associated with the account by the issuer;
intercept an authorization request for the interaction between the user and the third party, based on the authorization request including at least the hash key and a user-entered code;
confirm the code from the issuer matches the user-entered code in the authorization request; and then
based on the code from the issuer matching the user-entered code, direct the authorization request to the issuer.

11. The non-transitory computer-readable storage medium of claim 10, wherein the computer-executable instructions, when executed by the processor, further cause the processor to store the code received from the issuer in a data structure, in association with the PAN for the account.

12. The non-transitory computer-readable storage medium of claim 11, wherein the computer-executable instructions, when executed by the processor to determine the PAN for the account based on the hash key, cause the processor to search for the PAN in the data structure, based on the hash key.

13. The non-transitory computer-readable storage medium of claim 10, wherein the code includes a one-time passcode, randomly generated by the issuer.

14. The non-transitory computer-readable storage medium of claim 10, wherein the hash key includes an encrypted version of the PAN and a salt.

15. The non-transitory computer-readable storage medium of claim 14, wherein the salt includes an image.

16. The non-transitory computer-readable storage medium of claim 15, wherein the computer-executable instructions, when executed by the processor, further cause the processor to receive, from the third party, a name of the user as the name appears on a card device specific to the account; and
wherein the computer-executable instructions, when executed by the processor to determine the PAN for the account, causes the processor to determine the PAN for the account based on the hash key and the name of the user.

17. A system for identifying an account, via a hash key presented to a third party, in connection with a network interaction involving the third party, the system comprising:
a payment network computing device disposed in communication between the third party and an issuer of an account involved in the network interaction, wherein the payment network computing device is configured to:
receive, from the third party, a hash key specific to the account in connection with the network interaction, the hash key including alpha-numeric characters, the hash key issued by the issuer of the account, and the hash key being distinct from a primary account number (PAN) for the account;

determine the PAN for the account based on the hash key;
identify the issuer of the account based at least in part on the determined PAN;
transmit a verification request including one or more details associated with the account to the issuer of the account, whereby the issuer verifies the one or more details associated with the account;
receive a random code from the issuer, the random code indicative of verification of the one or more details associated with the account by the issuer;
identify an authorization request for the network interaction, from the third party, the authorization request including at least the hash key a user-entered code;
intercept the authorization request, based on the authorization request including the hash key;
confirm the random code from the issuer matches the user-entered code in the authorization request; and then
based on the random code from the issuer matching the user-entered code, direct the authorization request to the issuer.

18. The system of claim 17, wherein the payment network computing device is further configured to receive, from the third party, a name of a user associated with the account; and
wherein the payment network computing device is configured, in order to determine the PAN for the account, to determine the PAN for the account based on the hash key and the name of the user.

19. The system of claim 18, wherein the payment network computing device is further configured to store the random code received from the issuer in a data structure, in association with the PAN for the account; and
wherein the payment network computing device is configured, in order to determine the PAN for the account based on the hash key, to search for the PAN in the data structure, based on the hash key.

20. The system of claim 19, wherein the random code includes a one-time passcode, randomly generated by the issuer; and
wherein the hash key includes an encrypted version of the PAN and a salt.

* * * * *